United States Patent [19]

Howard, Jr. et al.

[11] 3,815,123

[45] June 4, 1974

[54] LADDER TERMINATION CIRCUIT

[75] Inventors: William G. Howard, Jr., Mesa; James B. Cecil, Tempe, both of Ariz.

[73] Assignee: Motorola, Inc., Franklin Park, Ill.

[22] Filed: May 10, 1972

[21] Appl. No.: 252,133

Related U.S. Application Data

[63] Continuation of Ser. No. 109,464, Jan. 25, 1971.

[52] U.S. Cl. .......................................... 340/347 DA
[51] Int. Cl. .......................................... H03k 13/04
[58] Field of Search ............. 340/347 DA; 307/242; 330/30 D

[56] References Cited

UNITED STATES PATENTS

| | | | |
|---|---|---|---|
| 3,258,765 | 6/1966 | Battjes | 340/347 DA |
| 3,290,671 | 12/1966 | Lamoureux | 340/347 DA |
| 3,366,889 | 1/1968 | Avins | 330/30 D X |
| 3,474,440 | 10/1969 | Schmid | 340/347 DA |
| 3,581,303 | 5/1971 | Kelly | 340/347 DA |

*Primary Examiner*—Charles D. Miller
*Attorney, Agent, or Firm*—Mueller, Aichele & Ptak

[57] ABSTRACT

An improved termination circuit for the ladder portion of a digital to analog converter. The termination circuit includes an amplifier having unity current and voltage amplification factors and a very low impedance looking from the ladder into the amplifier.

6 Claims, 1 Drawing Figure

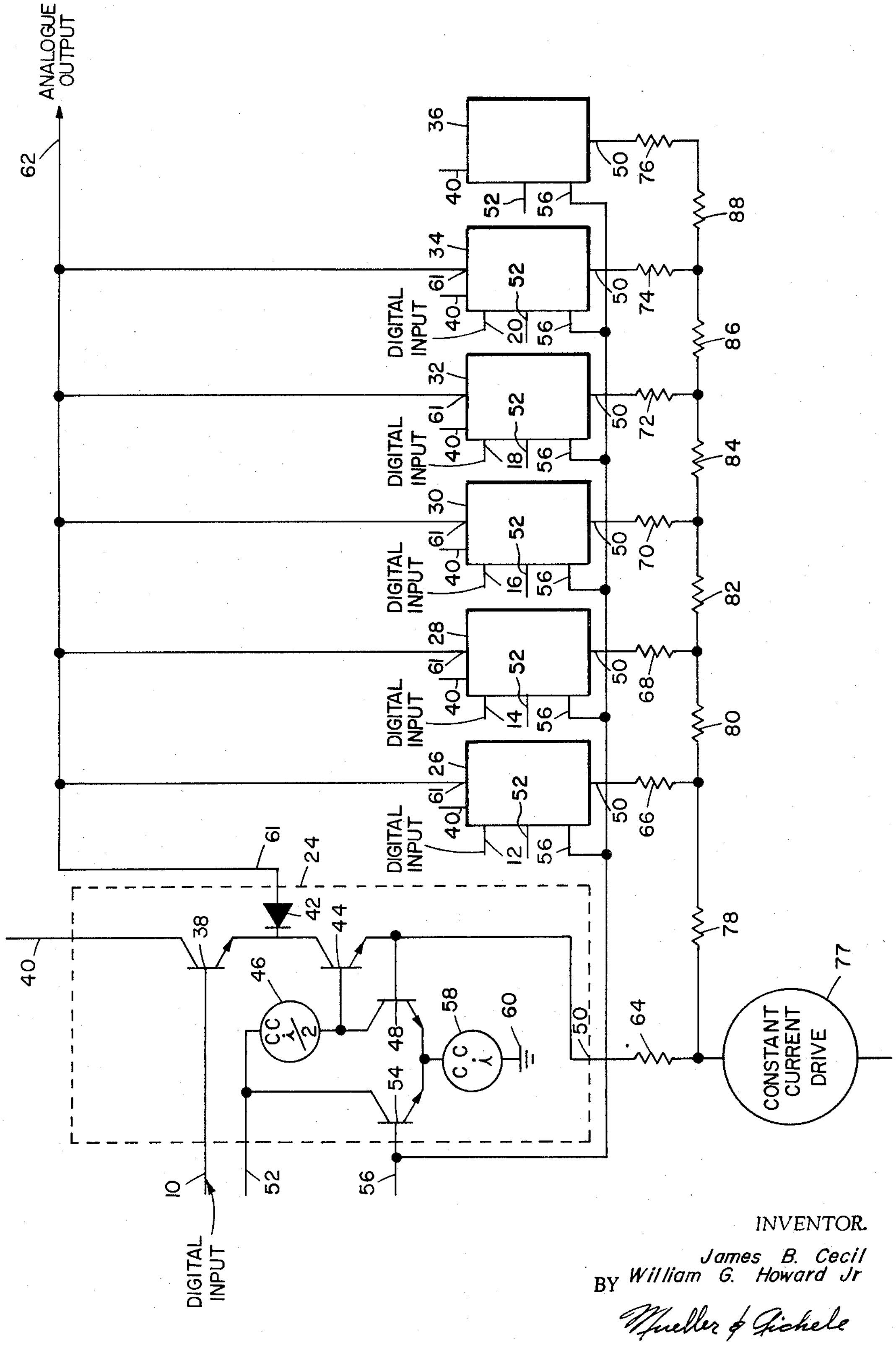
INVENTOR.
James B. Cecil
BY William G. Howard Jr
Mueller & Aichele
ATTY'S.

LADDER TERMINATION CIRCUIT

This is a continuation of application Ser. No. 109,464, filed Jan. 25, 1971.

BACKGROUND

A digital number is converted in accordance with the prior art into an analog amount by circuits employing a known resistance network which is called a ladder. The various branches of the network or rungs of the ladder carry currents which are digitally related and a digital number input causes the current in a rung or rungs of the ladder to flow in an analog output circuit. The several rungs are terminated in the prior art by connections to respective transistors which are operated in a common base mode and whose emitter areas are related to the current flow in the respective rungs, whereby the current flow in the several rungs may be independent of each other and may be independently connected to the analog output circuit, so that the current in the analog output circuit may be controlled in a digital manner. The transistors having various areas of the emitters are difficult to deposit on a chip with high enough degree of accuracy to provide a low and uniform resistance at the several emitters and the same potential at the several emitters, and also to provide a properly scaled current flow from the several emitters.

It is an object of this invention to provide an improved terminating network for the rungs of a digital to analog ladder circuit.

It is another object of this invention to provide a termination network comprising an amplifier having a unity amplification factor both for current and for voltage and a low resistance when seen from the direction of the rungs of the ladder.

SUMMARY

According to this invention, the analog output terminal is connected to the rungs of a ladder by way of separate amplifiers. Each amplifier has a one to one current ratio whereby the currents going into and out of the amplifier are equal. The amplifier also has a one to one voltage amplification ratio whereby an input or bias terminal of the amplifier controls the output voltage at the ladder terminal of the amplifier and also the amplifier is so constructed that the ladder terminal into the amplifier sees a low impedance or resistance.

DESCRIPTION

The invention will be better understood upon reading the following description in connection with the accompanying drawing, the single FIGURE of which illustrates a digital to analog ladder including the termination amplifiers of the present invention.

In the FIGURE, a binary number, consisting of the digits, zeros and ones, is applied to the several terminals 10, 12, 14, 16, 18 and 20. The most significant digit is applied to the input terminal 10 and the other digits are applied in the order of lesser significance to the input terminals 12, 14, 16, 18 and 20 respectively. The contents of the dotted rectangle 24 and of the rectangles 26, 28, 30, 32 and 34 are the same. The contents of the rectangle 36 differs from the contents of the rectangles 24 to 34 only in that there is no provision for a digital input terminal such as the terminals 10 to 20 of the rectangles 24 to 34 whereby an output terminal such as 61 is not required for the rectangle 36. Therefore, only the contents of the rectangle 24 is described. The input terminal 10 is connected to the base of an NPN transistor 38 which acts as a switch. Since all the transistors shown are of the NPN type, no further mention of the type of transistors will be made in this description. The collector of the transistor 38 is connected to an input terminal 40 to which the positive terminal of the power supply source (not shown) is to be connected. The emitter of the transistor 38 is connected to the cathode of a diode 42 and to the collector of a transistor 44. (In the rectangle 36, no transistor 38 or diode 42, which comprise switching means, or input terminal such as 10 need be provided and the terminal 40 is connected directly to the collector of a transistor such as the transistor 44). The base of the transistor 44 is connected to a terminal of a constant current source 46 and to the collector of transistor 48. The emitter of the transistor 44 is connected to the base of the transistor 48 and to a ladder terminal 50 of the amplifier in the rectangle 24. A voltage supply terminal 52 is connected at the other terminal to constant current source 46 and to the collector of a transistor 54. The base of the transistor 54 is connected to a bias terminal 56 to which a fixed bias voltage with respect to ground is applied. The emitters of the two transistors 54 and 48 are connected together and by way of a constant current source 58 to a fixed reference terminal such as ground 60. The connection 61 to the anode of the diode 42 is the output of the amplifier 24. Each of the amplifiers comprising the elements 44, 46, 48, 54 and 58 as well as the switch which comprises the elements 38 and 42 in the rectangles 26 to 34 are, as has been noted, identical with the amplifier 24. However, only the input terminals 12 to 20, the bias terminals 56, the ladder terminals 50, the supply terminals 40 and 52 and the output terminals 61 are shown for the rectangles 26 to 34 and, for the rectangle 36, the input terminal and the output terminal 61 are omitted. All the terminals 61 are connected to the analog terminal 62 whereby the current at the terminal 62 is the sum of the current from the several terminals 61 as controlled by the digital inputs 10 to 20.

While the ladder network having branches or rungs is well known, it is described for completeness. The ladder terminals 50 of the amplifiers 24, 26, 28, 30, 32, 34 and 36 are connected to one terminal of the respective resistors 64, 66, 68, 70, 72, 74 and 76. The other terminal of the resistor 64 is connected to one terminal of constant current device 77 whose other terminal is connected to the other terminal of the source (not shown) which is connected to the terminal 40. The said other terminal of the resistor 64 is connected to the other terminal of the resistor 66 by way of a resistor 78. The other terminals of the resistor 66 and 68 are connected by way of resistor 80. The other terminals of the resistors 68 and 70 are connected by way of resistor 82. The other terminal of the resistors 70 and 72 are connected by way of resistor 84. The other terminals of the resistors 72 and 74 are connected by way of resistor 86, and the other terminals of the resistors 74 and 76 are connected by way of a resistor 88. Then, if the resistance of each of the resistors 64, 66, 68, 70, 72 and 74 are the same (2R) and are each equal to twice the resistances of each of the resistors 76, 78, 80, 82, 84, 86 and 88, (an R-2R network) then the conventional current flowing out of the terminals 50 of the rectangles 24, 26, 28, 30, 32, 34 and 36 are equal to 32I, 16I, 8I, 4I, 2I, I and I, respectively where the constant current drive 77 is equal to 64I. As noted above, there is no terminal 61 for the rectangle 36, whereby when digital zeros (using positive logic) are applied to all the digital input terminals 10, 12, 14, 16, 18 and 20, 63I current flows in the analog terminal 62 and when digital ones are applied to the terminals 10, 12, 14, 16, 18 and 20 no current flows in the digital output terminal 62 and, similarly for any binary number applied to the terminals 10, 12, 14, 16, 18 and 20, the most significant digit being applied to the terminal 10, as noted above, the current flow in the analog terminal 62 is determined by the value of the binary number.

Having explained the general operation of digital to analog converters, the operation of the amplifier included in the rectangle 24 is now described. As noted, the transistor 38 and the diode 42 comprise a switch and are not part of the amplifier. As noted above, conventional current flows from the terminal 40, through the collector to emitter paths of the transistors 38 and 44 in series to the ladder terminal 50 when a binary one is applied to the base of the transistor 38, and this current flows from the terminal 62 through the diode 42 through the collector to emitter path of the transistor 44 and through the terminal 50 when the transistor 38 is blocked by the application of a negative voltage with respect to the voltage at the terminal 62 indicating a binary zero to the base thereof, and the other amplifiers included in the rectangles 26 to 34 operate similarly. The ratio of the current flow at the collecter of the transistor 44 to that at the terminal 50 for each of the amplifiers in the rectangles 24 to 34 must be unity at all times for the digital to analog converter to operate properly. That is, the current at the collecter of the transistor 44 must always be equal to the current at the terminal 50 and to accomplish this result, the amplifiers in the rectangles 24 to 34, as well as the amplifier in the rectangle 36 must have a current amplification value of unity.

Since both of the transistors 44 and 48 have high Betas, (on the order of 50), and since the current supplied by the source 46 is small, the base current for the transistor 48 is very small. Furthermore due to the high Beta of the transistor 44, the base current for this transistor is also small. Therefore, the collector current of the transistor 44 is substantially equal to the current at terminal 50. Also, it will be noted that some of the current flow out of the emitter of the transistor 44 is derived from the base thereof whereby the current at the emitter of the transistor 44 is greater than the current at the collector thereof. At least some of this additional current (which is very small) is used to supply base current for the transistor 48 and therefore does not appear at the terminal 50. Therefore, due to the two cooperating effect, the current amplification of the amplifier in the rectangles 24–34 are all equal to unity.

As is required for proper operation of the ladder, the voltage at all the ladder terminals 50 is maintained at the same voltage, the voltage being the voltage of the bias terminal 56. This is accomplished as follows. The current flow through the constant current source 46 is always one-half the current flow through the constant current source 58, whereby the current flow from the emitter of the transistor 48 is one-half the current flow through the constant current source 58. Therefore, the current normally drawn by the transistor 54 is equal to the current drawn by the transistor 48. Therefore, the transistors 54 and 48 being as nearly identical as possible, the voltage drop from the base to ground of the two transistors 54 and 48 are equal, and equal to the bias voltage applied to the base of the transistor 56. Therefore, all the points 50 are at the same voltage with respect to ground and the amplifiers have a unity voltage amplification factor between their terminals 56 and 50. Since the same bias voltage is applied to all the amplifiers 24 to 36, all the ladder terminals 50 are at the same voltage level.

Furthermore, the resistance of the amplifiers 24 to 36 is low looking into the amplifiers from the ladder terminals 50. This is due to the fact that the terminal 50 is connected to a base of a transistor 48 and to the emitter of another transistor 44. Due to the negative feedback produced by the connection of the transistors 44 and 48, as is well known, the resistance of the amplifiers in the rectangles 24 to 36 is low. Since this resistance is low with respect to the resistance of the ladder elements 64 to 88 the ladder can be accurately constructed without the necessity of taking into account large amplifier resistances.

While a 6 bit ladder is shown, the number of bits can be made as great or as small as desired by adding or subtracting amplifiers and ladder sections. While NPN transistors are shown, PNP transistors may be substituted therefore in a known manner. While this invention is best suited to be put on a chip, discrete elements may be used if desired.

What is claimed is:

1. A digital to analog converter having at least two stages, each corresponding to a different digit of a binary number and each coupled from a ladder terminal through a resistive R-2R current division network to a common constant current drive source, the current division network operating to provide different predetermined constant currents to the ladder terminals of each of said stages; a ladder terminal network including in combination:

at least two ladder termination circuits, one for each stage of said converter, and each having a ladder terminal comprising the ladder terminal for its respective stage;

means for maintaining the same bias voltage on the ladder terminals of each of said ladder termination circuits;

an analog output terminal common to all of said ladder termination circuits;

unity gain current amplifier means in each of said ladder termination circuits;

separate switching circuit means in each of said ladder termination circuits, each of said switching circuit means having a common terminal and second and third terminals, said second terminal being coupled with said analog output terminal, said third terminal being coupled with a first voltage supply terminal, and said common terminal and said unity gain current amplifier in each ladder termination circuit coupled in series circuit, in the order named, with the ladder terminal of such ladder termination circuit, said switching circuit means operable to complete a current path from one of said second and said third terminals thereof to said common terminal thereof in response to different states of a binary signal applied thereto; and means for separately applying binary signals representative of different digits of binary numbers to said switching circuit means in each of said ladder termination circuits.

2. The combination according to claim 1 wherein each of said switching circuit means comprises a diode and a transistor having first and second main electrodes and a control electrode, the first main electrode of said transistor and the cathode of said diode connected in common to form the common terminal of said switching circuit means, the second main electrode of said transistor comprising said third terminal of said switching circuit means and the anode of said diode comprising said second terminal thereof, said means for applying binary signals to said switching circuit means being coupled with the control electrode of said transistor.

3. The combination according to claim 1 wherein said unity gain current amplifier means in each of said ladder termination circuits includes a first transistor having first and second main electrodes and a control electrode, and said means for maintaining the same bias voltage in each of said ladder termination circuits includes second and third transistors, each having first and second main electrodes and a control electrode, the first main electrodes of each of said second and third transistors in each of said ladder terminal circuits are coupled in common to a point of reference potential through a first constant current device, and the second main electrodes of said second and third transistors in each of said ladder termination circuits are coupled with a second voltage supply terminal, the control electrodes of said second transistors of each of said ladder termination circuits are coupled with a common bias voltage supply terminal, and the first main electrode of said third transistor in each of said ladder termination circuits is coupled with the control electrode of said first transistor, in the same ladder termination circuit the first main electrode of said first transistor in each of said ladder termination circuits is coupled with the common terminal of said switching circuit means and the second main electrode of said first transistor in each of said ladder termination circuits is coupled with the control electrode of said third transistor and the ladder terminal of the ladder termination circuit of which first transistor is a part.

4. The combination according to claim 3 further including a second constant current device in each of said ladder termination circuits coupled between said second voltage supply terminal and the common connection of the first electrode of said third transistor and the control electrode of said first transistor.

5. The combination according to claim 4 wherein said second constant current device supplies current having a value which is one-half the value of the current supplied by said first constant current device.

6. The combination according to claim 5 wherein said switching circuit means comprises a diode and a transistor having first and second main electrodes and a control electrode, the first main electrode of said transistor and the cathode of said diode connected in common to form the common terminal of said switching circuit means, the second main electrode of said transistor comprising said third terminal of said switching circuit means and the anode of said diode comprising said second terminal thereof, said means for applying binary signals to said switching circuit means being coupled with the control electrode of said transistor.

* * * * *